United States Patent
Karim et al.

(10) Patent No.: US 6,537,659 B2
(45) Date of Patent: Mar. 25, 2003

(54) ACIDIC POLYMER-BASED THERMOSETTABLE PSAS, METHODS OF THEIR USE, AND THERMOSET ADHESIVES THEREFROM

(75) Inventors: Naimul Karim, Maplewood, MN (US); Ashish Kumar Khandpur, Roseville, MN (US); Dmitriy Salnikov, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/742,564

(22) Filed: Dec. 20, 2000

(65) Prior Publication Data

US 2001/0007003 A1 Jul. 5, 2001

Related U.S. Application Data

(63) Continuation-in-part of application No. 09/466,956, filed on Dec. 20, 1999, now abandoned.

(51) Int. Cl.$^7$ ............................................... B32B 27/30
(52) U.S. Cl. ...................... 428/355 AC; 428/355 EP; 428/349; 428/352; 428/41.5; 428/41.8; 428/42.3; 525/451; 526/317.1; 526/318; 526/318.3; 526/328; 526/329.7; 526/931; 156/330
(58) Field of Search .................... 428/355 EP, 41.5, 428/41.8, 42.3, 349, 355 AC; 525/451; 526/317.1, 318, 318.1, 318.3, 328, 329.7, 931; 156/330

(56) References Cited

U.S. PATENT DOCUMENTS

| | | | |
|---|---|---|---|
| 2,839,513 A | 6/1958 | Ahlbrecht et al. | |
| 2,925,174 A | 2/1960 | Stow | |

(List continued on next page.)

FOREIGN PATENT DOCUMENTS

| | | |
|---|---|---|
| CZ | 227 514 | 9/1985 |
| DD | 129924 | 2/1978 |
| DE | 3634780 A1 | 4/1988 |
| DE | 3726956 A1 | 2/1989 |
| EP | 0 798 354 A1 | 10/1997 |
| JP | 51-57723 | 11/1974 |
| JP | 75-028970 | 9/1975 |
| JP | 61-76542 | 4/1986 |
| JP | 61-103957 | 5/1986 |
| JP | 61-278554 | 12/1986 |
| JP | 02-006581 | 1/1990 |
| WO | WO 95/13328 | 5/1995 |
| WO | WO 96/21704 | 7/1996 |
| WO | WO 97/33945 | 9/1997 |
| WO | WO 98/51754 | 11/1998 |

OTHER PUBLICATIONS

"Mixing in Single–Screw Extruders," *Mixing in Polymer Processing*, edited by Chris Rauwendaal (Marcel Dekker Inc.: New York (1991), pp. 129, 176–177, and 185–186).

Encyclopedia of Polymer Science and Technology, Plastics, Resins, Rubbers, Fibers, vol. 4, pp. 384–398, 1966.

*Primary Examiner*—Robert Dawson
*Assistant Examiner*—Christopher Keehan
(74) *Attorney, Agent, or Firm*—Scott R. Pribnow

(57) ABSTRACT

Thermosettable PSA compositions of the invention comprise a major proportion of the adhesive component of at least one acidic polymer and at least one amine-containing compound capable of reacting with acidic functional groups on the acidic polymer to cure the thermosettable PSA composition into a thermoset adhesive. The thermosettable PSA compositions are particularly useful for forming semi-structural or structural bonds. Thermoset adhesives therefrom and methods of forming the thermoset adhesives are also disclosed.

35 Claims, 1 Drawing Sheet

U.S. PATENT DOCUMENTS

| | | |
|---|---|---|
| 3,845,163 A | 10/1974 | Murch et al. |
| 4,018,733 A | 4/1977 | Lopez et al. |
| 4,038,454 A * | 7/1977 | Lehmann et al. ............ 428/356 |
| 4,045,399 A | 8/1977 | Suzuki et al. |
| 4,167,505 A | 9/1979 | Dunkelberger |
| 4,181,752 A | 1/1980 | Martens et al. |
| 4,395,518 A | 7/1983 | Giles, Jr. et al. |
| 4,396,675 A | 8/1983 | Groff |
| 4,404,246 A | 9/1983 | Charbonneau et al. |
| 4,490,424 A | 12/1984 | Gerace |
| 4,582,882 A | 4/1986 | Lynn et al. |
| 4,602,058 A | 7/1986 | Graham et al. |
| 4,612,209 A | 9/1986 | Forgo et al. |
| 4,619,979 A | 10/1986 | Kotnour et al. |
| 4,696,965 A | 9/1987 | Rasmussen |
| 4,769,285 A | 9/1988 | Rasmussen |
| 4,833,179 A | 5/1989 | Young et al. |
| 4,843,134 A | 6/1989 | Kotnour et al. |
| 5,011,560 A | 4/1991 | Nakai et al. |
| 5,028,484 A | 7/1991 | Martin et al. |
| 5,086,088 A | 2/1992 | Kitano et al. |
| 5,215,608 A | 6/1993 | Stroud et al. |
| 5,262,232 A | 11/1993 | Wilfong et al. |
| 5,312,868 A | 5/1994 | Abe et al. |
| 5,344,956 A | 9/1994 | Allewaert et al. |
| 5,377,593 A | 1/1995 | Boothe et al. |
| 5,593,759 A | 1/1997 | Vargas et al. |
| 5,596,039 A | 1/1997 | Oishi et al. |
| 5,637,646 A | 6/1997 | Ellis |
| 5,686,509 A | 11/1997 | Nakayama et al. |
| 5,741,542 A | 4/1998 | Williams et al. |
| 5,883,193 A | 3/1999 | Karim |

* cited by examiner

ACIDIC POLYMER-BASED THERMOSETTABLE PSAS, METHODS OF THEIR USE, AND THERMOSET ADHESIVES THEREFROM

This is a continuation-in-part of application Ser. No. 09/466,956 filed Dec. 20, 1999 now abandoned.

FIELD OF THE INVENTION

The present invention relates generally to acidic polymer-based PSAs that are thermosettable to provide semi-structural or structural adhesives.

BACKGROUND OF THE INVENTION

When bonding substrates for applications that require particularly high bond strength, it may be desirable to use a PSA (PSA) that can be cured to form a high strength bond, or semi-structural or structural bond. Typically, such PSAs are referred to as thermosettable PSAs. An advantage of thermosettable PSAs is that they can be used to bond surfaces together without the need to clamp, or otherwise hold, the substrates together until the PSA is cured.

For example, see U.S. Pat. No. 5,593,759 (Vargas et al.), where a tape constructed of a core layer of structural adhesive is coated with PSA layers (e.g., acrylic PSAs). The multi-layer bonding tape construction can then be adhesively applied between parts to be bonded. The tape is then cured to form a structural bond. The core layer can be made of various different structural adhesives, such as a partially cured, B-stage structural adhesives or blends of an epoxy-containing material with an acrylate ester resin and hardener. Examples of hardeners include: trichloride amine complexes, boron trifluoride complexes, monoethyl amine, blocked amines, or dicyandiamide and the like. The hardeners are preferably incompatible with the resin at room temperature. It is not always desirable, however, to use a multi-layer adhesive when bonding. Multi-layer adhesives, such as those comprising a core layer coated with PSA layers, often require more complicated preparation procedures as compared to, for example, a single layer bonding adhesive.

Other adhesive systems relying on a combination of epoxy-containing materials and acrylate resins are also known. Similarly, these systems employ a curative, such as an amine-containing compound, which is typically referred to as an epoxy curative. See, for example, PCT Publication Number WO 96/21,704 (Minnesota Mining and Manufacturing Co.) and U.S. Pat. Nos. 4,612,209 (Forgo et al.); 5,011,560 (Nakai et al.); 5,086,088 (Kitano et al.); 5,686,509 (Nakayama et al.); and 5,883,193 (Karim).

It may not always be desirable to use bonding adhesives that include epoxy-containing materials, however. Epoxy-based adhesive systems (i.e., those systems containing epoxy-containing materials as the major component of the adhesive) generally rapidly lose their bond strength at temperatures above their glass transition temperatures as compared to, for example, (meth)acrylate-based adhesive systems (i.e., those systems containing (meth)acrylates as the major component of the adhesive). Furthermore, known adhesive systems comprising epoxy-containing materials are oftentimes brittle and, thus, may prove to be particularly difficult, for example, in effectively bonding irregular (e.g., nonplanar) surfaces or in being used in those applications where a certain degree of flexibility is required, or desired, in the resulting bond. For example, adhesives used in vibration damping articles may benefit from a certain degree of flexibility so as to allow the adhesive to absorb vibrations incident on the article. Other known epoxy-based adhesive systems may also lack moisture resistance, impact strength, or storage stability desired, or required, for a particular application.

As alternatives to epoxy-based adhesive systems, certain references describe crosslinking of (meth)acrylate polymers using amine-containing compounds similar to those described for use in epoxy-based adhesive systems. For example, U.S. Pat. No. 2,925,174 (Stow) describes crosslinking acrylate PSAs using certain polyfunctional polymeric amines. However, the crosslinked compositions are PSAs, which do not have enough bond strength for applications requiring semi-structural or structural bond strengths.

U.S. Pat. No. 5,596,039 (Oishi et al.) describes the use of certain diguanamines prepared from dicyandiamides for thermosetting compositions, including acrylic resins. The resins are purportedly useful in adhesive applications.

U.S. Pat. No. 4,404,246 (Charbonneau et al.) describes a PSA tape having an adhesive layer of a copolymer of alkyl acrylate and an acid, and a small amount of a lower-alkoxylated amino formaldehyde condensate as a latent crosslinking agent. After the tape has been applied and heated to crosslink the adhesive, the resultant bonds have outstanding resistance to peel forces combined with good resistance to shear forces, especially at elevated temperatures.

However, the lower-alkoxylated amino formaldehyde described in this reference contains tertiary amines and the lower-alkoxylated amino formaldehyde is used in amounts within the range of about 0.1–0.8% by weight of the copolymer. Furthermore, the adhesive must be heated moderately, such as at 120° C. for 30 minutes, to crosslink (i.e., cure) the adhesive. The more heat that is required during a process, however, the more energy must be expended, resulting in processes that take longer and cost more.

Similarly, see U.S. Pat. No. 4,396,675 (Groff). Again, the alkoxylated crosslinking agent contains tertiary amines. The crosslinking agent is used in amounts of about 0.1 to about 10 percent by weight of the copolymer, preferably 1 to 5 percent. Groff states that amounts above 10 percent would not enhance crosslinking and might detract from the adhesive properties of the tape.

Depending on the application and type of substrate being bonded, the use of moderate to high temperatures for curing the adhesive may also be problematic. This may be the case, for example, when heat-sensitive substrates are to be bonded. Heat-sensitive substrates include relatively low softening point or melting temperature plastics, such as polycarbonate, polyethylene terephthalate polyester, polymethyl methacrylate, and certain polyolefins, as well as substrates, such as electronic circuit boards, having heat-sensitive components attached thereto.

Other compositions comprising (meth)acrylates and amine-containing compounds are also known. For example, aqueous coating compositions comprising dicyandiamide dissolved in an aqueous solution of a salt of a copolymer of an unsaturated carboxylic acid monomer and a hydroxylalkyl (meth)acrylate monomer are disclosed in U.S. Pat. No. 4,045,399 (Suzuki et al.). Also see German Patent Publication Numbers DE 3634780 and DE 3726956 (both to Kruger). Furthermore, see Czechoslovakian Patent Number 227 514. However, when drying the aqueous coating compositions to remove water from the system, the coating compositions may become cured. Therefore, intermediate thermosettable adhesives may not be possible when using such aqueous systems and coating methods described therein. Furthermore, types and amounts of components used in aqueous systems must be carefully selected so as to be soluble in water, limiting formulation latitude.

Vulcanizable acrylic rubber compounds comprising dicyandiamide are described in Japanese Patent Publication Numbers JP 61-076542; JP 61-278554; and JP 61-1103957. Powder coating compositions comprising acrylic polymers and dicyandiamide are described in Japanese Patent Publication Number 51-057723.

Alternative thermosettable PSAs are desired. Such compositions would be particularly useful for bonding substrates without the need to clamp, or otherwise hold, the substrates together until the PSA is cured. It would also be desirable for the PSAs to be capable of being cured to form high bond strength adhesives, such as semi-structural or structural bond adhesives.

SUMMARY OF THE INVENTION

Thermosettable PSA (PSA) compositions of the invention comprise a major proportion of the adhesive component of at least one acidic polymer and at least one amine-containing compound capable of reacting with acidic functional groups on the acidic polymer to cure the thermosettable PSA composition into a thermoset adhesive. The thermosettable PSA compositions are particularly useful for forming semi-structural or structural bonds.

In one embodiment, the thermosettable PSA composition comprises 100 parts by weight of an adhesive component comprising at least about 50 percent by weight of the adhesive component of at least one acidic polymer and, optionally, no more than about 10 percent by weight of the adhesive component of at least one epoxy-containing material; and about 1 to less than about 50 parts by weight of at least one amine-containing compound capable of reacting with acidic functional groups on the acidic polymer to cure the thermosettable PSA composition into a thermoset adhesive.

In another embodiment, the thermosettable PSA composition comprises 100 parts by weight of an adhesive component comprising at least about 50 percent by weight of the adhesive component of at least one acidic polymer and, optionally, no more than about 25 percent by weight of the adhesive component of at least one epoxy-containing material, wherein the acidic polymer is derived from at least about 2% by monomer weight of at least one acidic monomer; and about 1 to less than about 50 parts by weight of at least one amine-containing compound capable of reacting with acidic functional groups on the acidic polymer to cure the thermosettable PSA composition into a thermoset adhesive.

For optimum curing capabilities, preferably the amine-containing compound is capable of curing the thermosettable PSA composition at temperatures of less than about 150° C., more preferably at temperatures of less than about 120° C., and even more preferably at temperatures of less than about 100° C. It is also preferred that the amine-containing compound is a solid at both room temperature and temperature at which the amine-containing compound is capable of curing the thermosettable PSA composition. Similarly, it is also preferred that the amine-containing compound is essentially insoluble or immiscible with the acidic polymer at room temperature and temperatures up to temperatures at which the amine-containing compound is capable of curing the thermosettable PSA composition.

In certain embodiments, the amine-containing compound comprises about 5 to about 20 parts by weight of the thermosettable PSA composition. However, it is to be understood that the thermosettable PSA composition can contain more or less of the amine-containing compound, depending on the particular application.

Preferably, the amine-containing compound comprises at least two amines selected from primary amines, secondary amines, and mixtures thereof. Particularly useful are non-aromatic amine-containing compound and those amine-containing compounds having a molecular weight of about 500 grams/mole or less. One example of a particularly useful amine-containing compound is dicyandiamide.

A wide variety of acidic polymers may be used. Preferably, the acidic polymer comprises a copolymer derived from at least one carboxylic acid, such as (meth) acrylic acid (e.g., acrylic acid). Preferably, the acidic polymer comprises an acidic (meth)acrylate polymer, such as a polymer derived from isooctyl acrylate and acrylic acid.

In certain embodiments, the acidic polymer comprises a polymer derived from up to about 25 percent by monomer weight of at least one acidic monomer. In further embodiments, the acidic polymer comprises a polymer derived from about 2 to about 15 percent by monomer weight of at least one acidic monomer.

Due to the disadvantages associated with conventional epoxy-based adhesives, preferably, the adhesive component comprises no more than 0 to about 5 percent by weight of at least one epoxy-containing material. Most preferably, the adhesive component is essentially free of epoxy-containing materials.

In one embodiment, thermoset adhesives of the invention are capable of being used as semi-structural adhesives. In yet another embodiment, thermoset adhesives of the invention are capable of being used as structural adhesives. The thermoset adhesive compositions are preparable by curing thermosettable PSA compositions of the invention.

For example, in one embodiment, a thermoset adhesive of the invention comprises the reaction product of: 100 parts by weight of an adhesive component comprising at least about 50 percent by weight of the adhesive component of at least one acidic polymer and, optionally, no more than about 10 percent by weight of the adhesive component of at least one epoxy-containing material; and about 1 to less than about 50 parts by weight of at least one amine-containing compound capable of reacting with acidic functional groups on the acidic polymer to cure the thermosettable PSA composition into the thermoset adhesive.

In another embodiment, a thermoset adhesive of the invention comprises the reaction product of: 100 parts by weight of an adhesive component comprising at least about 50 percent by weight of the adhesive component of at least one acidic polymer and, optionally, no more than about 25 percent by weight of the adhesive component of at least one epoxy-containing material, wherein the acidic polymer is derived from at least about 2% by monomer weight of at least one acidic monomer; and about 1 to less than about 50 parts by weight of at least one amine-containing compound capable of reacting with acidic functional groups on the acidic polymer to cure the thermosettable PSA composition into a thermoset adhesive.

Thermosettable PSA compositions of the invention can be coated on at least a portion of any suitable substrate. For example, composites comprising a first substrate, a second substrate, and a thermosettable PSA composition positioned therebetween can be prepared. Once cured, the substrates are at least partially coated with a thermoset adhesive composition of the invention. In the case of composites, once cured, the composites comprise a thermoset adhesive composition positioned between the first and second substrates.

Articles comprising thermosettable PSA compositions and thermoset adhesive compositions of the invention include, for example, tapes. In one embodiment, a tape of the invention comprises a backing, and a layer of the thermosettable PSA composition on at least a portion of at least one side of the backing. In another embodiment, a transfer tape of the invention comprises a release liner, and a layer of the thermosettable PSA composition on at least a portion of the release liner.

Methods for bonding a substrate comprise the steps of: providing the substrate to be bonded, adhering a layer of the thermosettable PSA composition to at least one side of the substrate, adhering the thermosettable PSA layer to a surface to be bonded, and curing the thermosettable PSA to form a thermoset adhesive between the substrate and the surface. Preferably, the step of curing the thermosettable PSA comprises heating the thermosettable PSA at a temperature of less than about 150° C., more preferably at a temperature of less than about 120° C., and even more preferably at a temperature of less than about 100° C.

DETAILED DESCRIPTION OF THE PREFERRED EMBODIMENTS

Figure 1:
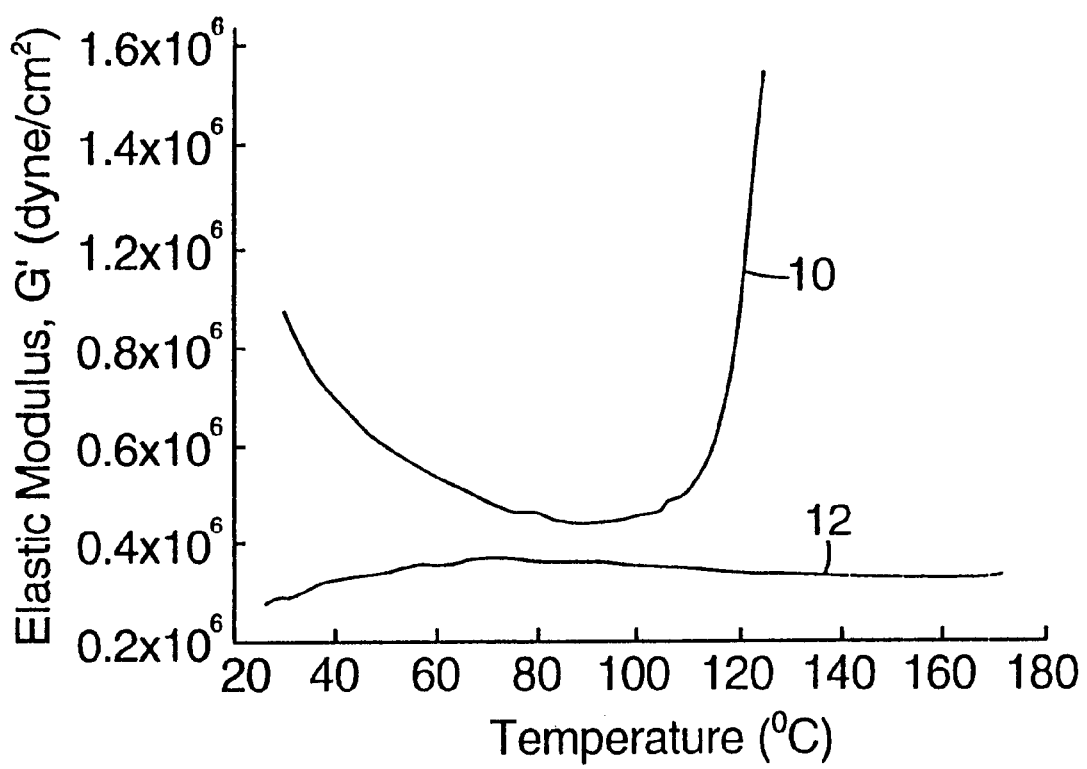
FIG. 1 is a graphical representation of temperature versus elastic modulus as set forth in Examples 8(A) and 8(B).

The present invention provides alternate thermosettable PSAs to those conventionally known. Thermosettable PSAs of the invention obviate the requirement for multi-layered structural bonding tape constructions, such as those described in U.S. Pat. No. 5,593,759 (Vargas et al.). While multiple layers may be included in tapes comprising a layer of the thermosettable PSA of the invention, such layers are not necessary to provide structural bonding tapes.

The following description refers to terms that are defined as follows:

"Pressure-sensitive adhesives (PSAs)" are well known to those of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend.

PSAs of the invention are thermosettable into thermoset (i.e., cured) adhesives having semi-structural or structural bond strengths. The bond strength is calculated against the substrate to which adhesion is desired.

"Thermoset Adhesives" are those adhesives that are irreversibly crosslinked (i.e., crosslinked by chemical reaction induced by, for example, heat or thermal radiation). Although thermoset adhesives of the invention may retain certain of the PSA properties possessed by the thermosettable PSAs, such as tack, they do not possess all properties required of PSAs of the present invention upon transformation to thermoset adhesives.

"Thermosettable PSAs" are those that are capable of being cured (i.e., crosslinked) upon exposure to an energy source, such as, for example, heat or thermal or actinic radiation, to provide a thermoset (i.e., cured) composition. As distinguished from hot-melt processable adhesives, thermosettable PSAs of the invention that cure upon exposure to thermal radiation are not able to be effectively coated using a hot-melt processing technique because the thermosettable PSA would prematurely cure when heated, potentially becoming thermoset inside the hot-melt processing equipment, prior to delivery of the PSA to the desired substrate. Similarly, most aqueous-based PSAs do not qualify as thermosettable PSAs of the invention because they would also cure upon exposure to the heat or thermal radiation necessary to remove water from the system to form the PSA. Consequently, thermosettable PSAs may be difficult or impossible to obtain from aqueous-based systems.

"Semi-Structural Adhesives" are those cured adhesives that have an overlap shear strength of at least about 0.5 MPa, more preferably at least about 1.0 MPa, and most preferably at least about 1.5 MPa. Those cured adhesives having a particularly high overlap shear strength, however, are referred to as structural adhesives.

"Structural Adhesives" are those cured adhesives that have an overlap shear strength of at least about 3.5 MPa, more preferably at least about 5 MPa, and most preferably at least about 7 MPa.

"Polymer" refers to macromolecular materials having at least five repeating monomeric units, which monomeric units may or may not be the same. The term polymer, as used herein, encompasses both homopolymers and copolymers. Polymers of the invention are derived from acidic monomers and, optionally, non-acidic monomers, such as (meth) acrylate monomers, other vinyl monomers, basic monomers, and combinations thereof.

"Acidic monomers" are those monomers that can be titrated with a base.

"Basic monomers" are those monomers that can be titrated with an acid.

An "acidic polymer" is a polymer that can be titrated with a base. The term acidic polymer, as used herein, includes both acidic homopolymers and acidic copolymers.

An "acidic copolymer" is a polymer that is derived from at least one acidic monomer and at least one non-acidic copolymerizable monomer (i.e., a monomer that can not be titrated with a base). In a preferred embodiment, at least one copolymerizable monomer is a (meth)acrylate monomer (e.g., an alkyl methacrylate monomer or an alkyl acrylate monomer). The acidic copolymer may optionally be derived from other copolymerizable monomers, such as other vinyl monomers and basic monomers, as long as the copolymer can still be titrated with a base. Usually, more acidic monomers are utilized to prepare the acidic copolymers than basic monomers. Preferably, however, in order to efficiently impart cohesive strength to the adhesive, essentially no basic monomers are utilized (i.e., the copolymerizable monomers include about 5 weight % or less of basic monomers, but most preferably, the copolymerizable monomers are free of basic monomers) to prepare acidic copolymers of the present invention.

Furthermore, acidic polymers of the invention preferably have a glass transition temperature (Tg) of about room temperature (i.e., 22° C.–25° C.) or less, more preferably about 10° C. or less, and most preferably about 0° C. or less. Thermoset PSAs based on acidic polymers having Tgs in this range generally have better impact resistance and fracture toughness, as well as being generally less brittle than those thermoset adhesives based on acidic polymers having higher Tgs.

Thermosettable PSAs of the invention comprise an adhesive component (i.e., the polymers necessary for bonding other substances together by surface attachment, not including optional additives) comprising at least one acidic polymer and at least one amine-containing compound for curing the acidic polymer. Typically, the acidic polymer is an acidic copolymer, preferably an acidic (meth)acrylate copolymer.

Potential problems associated with epoxy-based systems are described above in the Background of the Invention. Epoxy-containing materials tend to react with the acidic functional groups on the acidic polymer causing premature gellation of the composition and a potential loss of PSA properties. Reaction of epoxy-containing materials with acidic functional groups also decreases the number of acidic functional groups available for cure by the amine-containing compound. Furthermore, acidic functional groups may potentially cause homopolymerization of the epoxy-containing materials, which can also prematurely gel the composition.

Thus, preferably, thermosettable PSAs of the invention are not epoxy-based adhesive systems. That is, epoxy-containing materials comprise less than a major portion of the adhesive components (calculated by weight), if used. Preferably, epoxy-containing materials, if present, comprise less than about 25 percent by weight, more preferably less than about 10 percent by weight, and more preferably less than about 5 percent by weight, based on total weight of the adhesive components. Most preferably, thermosettable PSAs are essentially free of epoxy-containing materials.

In one embodiment, thermosettable PSAs of the invention are essentially free of epoxy-containing materials (i.e., the thermosettable PSAs contain about 0 percent by weight epoxy-containing materials). As such, thermosettable PSAs of the invention and cured adhesives therefrom oftentimes have improved properties over conventional epoxy-based adhesive systems. For example, the preferred cured adhesives are generally more flexible and have a higher percent elongation than many conventional epoxy-based adhesive systems. This enables cured adhesives of the present invention to be used more effectively in, for example, applications where a certain degree of flexibility is required, or desired, in the resulting bond, as when irregular surfaces are to be bonded. Improved flexibility is even noted in cured adhesives subject to low temperatures, where most adhesives typically become more rigid.

Furthermore, the preferred cured adhesives of the invention have improved moisture resistance over many conventional epoxy-based adhesives systems. This enables cured adhesives of the present invention to be used more effectively in, for example, applications where adherence to moist surfaces (e.g., those surfaces used in marine and medical applications) is required, or desired. Adhesives having improved moisture resistance are also more effectively used in climates having relatively high humidity.

Acidic Polymer

One or a combination of acidic polymers is used in the present invention. Acidic polymers are defined above.

Also suitable for use in the invention are those polymers that can be easily converted to an acidic polymer. For example, anhydride-based polymers can be hydrolyzed to provide corresponding acidic functional moieties to replace the anhydride moieties on the polymer. Maleic anhydride-based polymers are available from International Specialties Products (Wayne, N.J.) under the trade designations, GANTREZ and OMNIREZ. These polymers may be either hydrolyzed or alcoholyzed to form an acidic polymer. While unusual, there are also other polymers containing groups that can be converted to acidic functional moieties either thermally (as in the case of t-butyl esters) or photochemically (as in the case of 2-pyranyl esters) with the aid of a photocatalyst. Any polymer can be used so long as the polymer is converted to an acidic polymer of the invention prior to curing of the thermosettable adhesive.

Again, when used, polymers that are easily convertible to acidic polymers are converted to the corresponding acidic polymers prior to curing of the thermosettable adhesive. Generally, however, it is preferred to use acidic polymers that do not require any further processing steps for the formation thereof.

Certain acidic polymers are commercially available. For example, acrylic acid-based polymers are available from B.F. Goodrich Company (Greenville, S.C.) under the trade designation, CARBOPOL, and from Uniroyal Chemical (Middlebury, Conn.), under the trade designation, POLY-BOND (e.g., polypropylene acrylic acid copolymers). Ethylene/acrylic acid-based copolymers are available from Dow Chemical Company (Midland, Mich.) under the trade designation, PRIMACOR. Carboxymethylcellulose-based polymers are available from Akzo Nobel Chemicals, Inc. (Chicago, Ill.).

Alternatively, acidic polymers can be prepared using acidic monomers and optionally one, or a combination of, non-acidic monomer(s), such as (meth)acrylate monomers, basic monomers, and other vinyl monomers. These monomers are now described in further detail:

Acidic Monomers

Acidic monomers of the invention are generally ethylenically unsaturated carboxylic acids, acid anhydrides, and mixtures thereof Carboxylic acid monomers generally conform to the following general Formula (I):

where R represents an ethylenically unsaturated hydrocarbon group, which may be branched or straight-chained, substituted in the hydrocarbon chain with one or more heteroatoms, or unsubstituted in the hydrocarbon chain.

Examples of suitable monomers include acrylic acid, methacrylic acid, ethacrylic acid, alpha-chloroacrylic acid, alpha-cyanoacrylic acid, itaconic acid, fumaric acid, beta-methyl-acrylic acid (crotonic acid), alpha-phenylacrylic acid, beta-acryloxypropionic acid, sorbic acid, alpha-chlorosorbic acid, angelic acid, cinnamic acid, p-chlorocinnamic acid, beta-styrylacrylic acid (1-carboxy-4-phenylbutadiene-1,3), mesaconic acid, glutaconic acid, aconitic acid, tricarboxyethylene, vinyl benzoic acid, vinylphenylacetic acid, monoallylphthalic acid, citraconic acid, maleic acid, maleic anhydride, oleic acid, beta-carboxyethyl acrylate, and the like, and monoesters of the dibasic acids mentioned above, and mixtures thereof. Particularly preferred are (meth)acrylic acids (i.e., acrylic acid and methacrylic acid).

When the acidic polymer is a copolymer, the ratio of acidic monomers to non-acidic copolymerizable monomers varies depending on desired properties of the resulting thermosettable PSA and cured adhesive therefrom. These properties can also be adjusted by varying the amount of the acidic polymer and/or amine-containing compound in the composition. However, it is preferred to use acidic copolymers in the invention in order to provide an extra degree of freedom when formulating compositions of the invention.

Generally, as the proportion of acidic monomers used in preparing the acidic copolymer increases, cohesive strength of the resulting PSA and cured adhesive increases. The proportion of acidic monomers is usually adjusted depending on the proportion of acidic copolymer present in the compositions of the present invention. In some preferred embodiments, the proportion of acidic monomers is from about 1 up to about 25% by weight, preferably from about 2 to 18% by weight, more preferably from about 5 to 15% by weight, and most preferably about 10 to 15% by weight based on total monomer weight. In other embodiments, the proportion of acidic monomers is greater than about 25% by weight, but typically less acidic monomer is used in applications requiring relatively flexible bonds or when bonding to nonpolar substrates (e.g., polymeric or painted surfaces, which typically are also low surface tension substrates).

Non-Acidic Monomers

When the acidic polymer is a copolymer, it is preferred that it is a (meth)acrylate copolymer. Accordingly, the (meth)acrylate copolymer is derived from at least one (meth)acrylate monomer as well as at least one acidic monomer.

(Meth)acrylate Monomers (Meth)acrylate copolymers (i.e., those copolymers based on (meth)acrylates) useful in the invention contain at least one monofunctional unsaturated monomer selected from the group consisting of (meth)acrylate esters of non-tertiary alkyl alcohols, the alkyl groups of which comprise from about 1 to about 20, preferably about 1 to about 18, carbon atoms; and mixtures thereof. Preferred (meth)acrylate monomers have the following general Formula (II):

Formula (II)

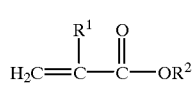

wherein $R^1$ is H or $CH_3$, the latter corresponding to where the (meth)acrylate monomer is a methacrylate monomer. $R^2$ is broadly selected from linear, branched, aromatic, or cyclic hydrocarbon groups. Preferably, $R^2$ is a linear or branched hydrocarbon group. The number of carbon atoms in the hydrocarbon group is preferably about 1 to about 20, and more preferably about 1 to about 18. When $R^2$ is a hydrocarbon group, it can also include heteroatoms (e.g., oxygen or sulfur) in the hydrocarbon chain.

Examples of suitable (meth)acrylate monomers useful in the present invention include, but are not limited to, benzyl methacrylate, n-butyl acrylate, n-butyl methacrylate, cyclohexyl acrylate, cyclohexyl methacrylate, decyl acrylate, 2-ethoxyethyl acrylate, 2-ethoxyethyl methacrylate, ethyl acrylate, 2-ethylhexyl acrylate, ethyl methacrylate, n-hexadecyl acrylate, n-hexadecyl methacrylate, hexyl acrylate, isoamyl acrylate, isobornyl acrylate, isobornyl methacrylate, isobutyl acrylate, isodecyl acrylate, isodecyl methacrylate, isononyl acrylate, isooctyl acrylate, isooctyl methacrylate, isotridecyl acrylate, lauryl acrylate, lauryl methacrylate, 2-methoxyethyl acrylate, methyl acrylate, methyl methacrylate, 2-methylbutyl acrylate, 4-methyl-2-pentyl acrylate, 1-methylcyclohexyl methacrylate, 2-methylcyclohexyl methacrylate, 3-methylcyclohexyl methacrylate, 4-methylcyclohexyl methacrylate, octadecyl acrylate, octadecyl methacrylate, n-octyl acrylate, n-octyl methacrylate, 2-phenoxyethyl methacrylate, propyl acrylate, n-tetradecyl acrylate, n-tetradecyl methacrylate, and mixtures thereof. Particularly preferred are the alkyl (meth) acrylate monomers.

Furthermore, (meth)acrylate monomers containing other functional groups may also be useful, depending on the desired application. For example, fluorochemical (meth) acrylate monomers that can be used in the invention are described in U.S. Pat. Nos. 4,582,882; 5,344,956; and 2,839,513.

Basic Monomers

When used, basic monomers suitable for use in the acidic copolymers include, for example, dialkylaminoalkyl (meth) acrylates (e.g., dimethylaminopropyl (meth)acrylate, diethylaminoethyl (meth)acrylate, etc.) and mixtures thereof. Any basic monomers may be used and in any amounts, provided the resulting polymer still meets the definition of an acidic polymer of the invention. However, it is preferred that aminoplasts, such as methylolacrylamide, are not used in the present invention because of the by-products (e.g., aldehydes) that result when aminoplasts are cured. Furthermore, aminoplasts tend to cure very rapidly in the presence of other aminoplasts, which can cause premature gellation of the compositions.

Vinyl Monomers

When used, other vinyl monomers useful in the acidic copolymers include: N-vinylpyrrolidone, N-vinylcaprolactam, acrylonitrile, N-vinylformamide, vinyl esters (e.g., vinyl acetate), (meth)acrylamide, styrene, substituted styrene (e.g., α-methylstyrene), vinyltoluene, vinyl chloride, vinyl propionate, and mixtures thereof.

Furthermore, difunctional vinyl monomers may be incorporated into acidic polymers of the invention. This may be useful when polymerizing on-web (i.e., when the polymerized composition is not intended to be coated after polymerization). For example, di(meth)acrylates (e.g., hexanediol di(meth)acrylates) may be useful in providing an acidic polymer that is initially crosslinked to a certain degree prior to curing by the amine-containing compound. Generally, difunctional vinyl monomers would be incorporated at less than about 1% by weight, typically less than about 0.1% by weight, and most typically less than about 0.001% by weight, of the total thermosettable PSA composition. Initial crosslinking provides thermosettable PSAs having improved cohesive strength over PSAs essentially free of crosslinks. Similarly, properties of the thermoset adhesives, such as shear strength and peel adhesion, are also improved when the thermosettable PSA has some initial crosslinking density.

Particularly preferred acidic polymers are (meth)acrylate acidic copolymers. Such copolymers are typically derived from monomers comprising about 75% by weight to about 99% by weight, preferably at least 80% by weight, and most preferably at least 85% by weight of at least one alkyl (meth)acrylate monomer that, as a homopolymer, has a Tg of less than about 0° C. Such copolymers are also typically derived from monomers comprising about 1% by weight to about 25% by weight, preferably about 2% by weight to about 15% by weight, of a copolymerizable acidic monomer.

Polymerization Methods

The acidic polymers can be prepared by any conventional free radical polymerization method, including, for example, solution, radiation, bulk, dispersion, emulsion, and suspension processes.

In one solution polymerization method, the monomers, along with a suitable inert organic solvent, are charged into a four-neck reaction vessel that is equipped with a stirrer, a thermometer, a condenser, an addition funnel, and a thermowatch. A concentrated thermal free radical initiator solution is added to the addition funnel. The whole reaction vessel, addition funnel, and their contents are then purged with nitrogen to create an inert atmosphere. Once purged, the solution within the vessel is heated to an appropriate temperature to activate the free radical initiator to be added, the initiator is then added, and the mixture is stirred during the course of the reaction. A 98% to 99% conversion should be obtained in about 20 hours.

Another polymerization method is ultraviolet (UV) radiation-initiated photopolymerization of the monomer mixture, such as the method described in U.S. Pat. No.

4,181,752 (Martens et al.) and U.S. Pat. No. 5,741,543 (Winslow et al.). After pre-polymerization to a coatable viscosity, the monomer mixture, along with a suitable photoinitiator and optional difunctional vinyl monomer, is coated onto a flexible carrier web and polymerized in a sufficiently inert (i.e., essentially oxygen free) atmosphere (e.g., a nitrogen atmosphere). A sufficiently inert atmosphere can be achieved by covering a layer of the photoactive coating with a plastic film that is substantially transparent to ultraviolet radiation and irradiating through the plastic film in air using low intensity, fluorescent-type ultraviolet lamps that generally give a total radiation dose of about 500 milliJoules per centimeter squared.

Bulk polymerization methods, such as the continuous free radical polymerization method described by Kotnour et al. in U.S. Pat. Nos. 4,619,979 and 4,843,134; the essentially adiabatic polymerization methods using a batch reactor described by Ellis in U.S. Pat. No. 5,637,646; suspension polymerization processes described by Young et al. in U.S. Pat. No. 4,833,179; and, the methods described for polymerizing packaged pre-adhesive compositions described by Hamer et al. in PCT Publication Number WO 97/33,945 may also be utilized to prepare the acidic polymers.

Suitable thermal free radical initiators which may be utilized include, but are not limited to, azo compounds, such as 2,2'-azobis(isobutyronitrile); hydroperoxides, such as tert-butyl hydroperoxide; and, peroxides, such as benzoyl peroxide and cyclohexanone peroxide. Photoinitiators which are useful according to the invention include, but are not limited to, those selected from benzoin ethers, such as benzoin methyl ether or benzoin isopropyl ether; substituted benzoin ethers, such as anisole methyl ether; substituted acetophenones, such as 2,2-diethoxyacetophenone and 2,2-dimethoxy-2-phenyl acetophenone; substituted alpha-ketols, such as 2-methyl-2-hydroxy propiophenone; aromatic sulfonyl chlorides, such as 2-naphthalenesulfonyl chloride; and, photoactive oximes, such as 1-phenyl-1,2-propanedione-2-(ethoxycarbonyl)oxime. For both thermal- and radiation-induced polymerizations, the initiator is present in an amount of about 0.05 percent to about 5.0 percent by weight based upon the total weight of the monomers.

Preferably, the polymers are polymerized without solvent. Yet, suitable inert organic solvent, if desired, may be any organic liquid that is sufficiently inert to the reactants and product such that the solvent will not otherwise adversely affect the reaction. Such solvents include ethyl acetate, acetone, methyl ethyl ketones, and mixtures thereof If used, the amount of solvent is generally about 30–80% by weight based on the total weight of the reactants (monomer and initiator) and solvent.

Chain transfer agents can also be utilized when polymerizing the polymers described herein to control the molecular weight of the polymers. Suitable chain transfer agents include halogenated hydrocarbons (e.g., carbon tetrabromide) and sulfur compounds (e.g., lauryl mercaptan, butyl mercaptan, ethanethiol, and 2-mercaptoether).

The amount of chain transfer agent that is useful depends upon the desired molecular weight and the type of chain transfer agent. Organic solvents (e.g., toluene, isopropanol, and ethyl acetate) can also be used as chain transfer agents, but they generally are not as active as, for example, sulfur compounds. The chain transfer agent is typically used in amounts of about 0.001 parts to about 10 parts; preferably, 0.01 to about 0.5 parts; and most preferably, about 0.02 parts to about 0.20 parts, based on total weight of the monomers.

Amine-Containing Compound

At least one amine-containing compound is included in the compositions of the invention. The amine-containing compound is capable of reacting with acidic functional groups on the acidic polymer to cure the thermosettable PSA into a semi-structural or structural adhesive. In general, suitable amine-containing compounds contain at least two primary or secondary amine-functional groups thereon that are reactive with the acidic polymer of the invention. In this manner, the amine-containing compounds are capable of crosslinking the acidic polymers with high strength, covalent bonds.

In one embodiment, the amine-containing compound is non-aromatic. Aromatic amine-containing compounds are less basic than aliphatic amine-containing compounds. Thus, higher temperatures are generally needed to cure adhesive using aromatic amine-containing compounds. The requirement for higher temperatures leads to less efficient, more expensive, processing of the thermosettable PSAs.

Preferably the amine-containing compound is a relatively low temperature curing agent. That is, preferably the amine-containing compound is capable of curing the thermosettable PSA at temperatures below about 150° C., more preferably at temperatures below about 120° C., and most preferably below about 100° C. in a relatively short time period (i.e., within about 30 minutes using a conventional forced air heating oven). Cure can even be accomplished in as short a time as a few seconds, particularly when using a rapid heating mechanism. Rapid heating mechanisms include, for example: lasers, microwaves, induction-heating apparatuses, and infrared heating apparatuses. Lower temperature cures are particularly desired when heat-sensitive substrates are being adhered using the PSA and structural adhesives of the invention. This advantage is in addition to the processing benefits obtained when using lower temperatures.

An example of a low temperature curing agent discovered to be useful for curing the acidic polymer of the invention is dicyandiamide. Dicyandiamide is commercially available, for example, from Air Products Co. of Allentown, Pa. under the trade designation AMICURE, and from SKW Americas, Inc. of Amherst, N.Y. under the trade designation, DYHARD 100SF. When using dicyandiamide, gellation of the thermosettable PSA is not typical. Gellation can be problematic, for example, when making a thermosettable PSA coating on a substrate. Gel breakers may be needed to decrease gellation of the thermosettable PSA in order to effectively apply the desired coating thickness of the thermosettable PSA to a substrate. However, a gel breaker additive is not necessary when using dicyandiamide as the amine-containing compound.

In one embodiment, the amine-containing compound is not a polymer, but a relatively low molecular weight compound. That is, the amine-containing compound has a molecular weight of about 500 grams/mole or less. Preferably, the molecular weight of the amine-containing compound is about 70 grams/mole to about 300 grams/mole. The use of a relatively low molecular weight amine-containing compound is thought to contribute to the ability of amine-containing compounds of the invention to cure thermosettable PSAs of the invention at preferred lower temperatures.

In another embodiment, the amine-containing compound is a solid at room temperature and the curing temperature. Preferably, the amine-containing compound is a solid at temperatures of about 150° C. or less. Solid amine-containing compounds are generally easier and less odorous to use.

In yet another embodiment, the amine-containing compound is essentially immiscible or insoluble (i.e., gross phase separation is visible with an unaided human eye) with the acidic polymer at room temperature and temperatures up to the curing temperature. It is thought that this embodiment of the amine-containing compound contributes to increased storage stability of the composition. That is, immiscibility or insolubility of the amine-containing compound with the acidic polymer increases reaction time between the two components during cure of the thermosettable PSA, it is thought that this property contributes to thermosettable PSAs having a longer shelf life, even shelf lives of as long as several years. It is also thought that this preferred aspect of the amine-containing compound prevents the thermosettable PSA from prematurely crosslinking during processing steps (e.g., coating the PSA onto a substrate to form a tape) preceding desired cure of the thermosettable PSAs.

If the amine-containing compound is supplied in a fine particle size, the reaction time can be decreased between the acidic polymer and the amine-containing compound. Furthermore, a finer particle size provides for more homogeneous dispersion of the amine-containing compound throughout the thermosettable PSA and, thus, more uniform crosslinking of the resulting thermoset adhesive.

The amounts and types of components used in preparing the thermosettable PSAs comprising the adhesive component and amine-containing compounds of the present invention can be varied to provide a range of adhesive properties desired for the end use. Generally, the adhesive component comprises at least about 50% by weight, more typically about 60% to about 99% by weight, and most typically about 80% to about 95% by weight of the total weight of the adhesive component and amine-containing compound.

The amine-containing compound can comprise up to about 50% by weight of the total weight of the adhesive component and amine-containing compound. For adequate bond strength of cured adhesives, however, it is preferred that the amine-containing compound comprise at least about 1% by weight, more preferably at least about 5% by weight, even more preferably at least about 10% by weight, and most preferably at least about 12% by weight of the total weight of the adhesive component and amine-containing compound.

Preparation of the Thermosettable PSA

The components of the thermosettable PSA are blended together using any suitable method such that the uncured composition is a thermosettable PSA. The components can be blended using various methods and at several times during processing of the PSA. For example, the amine-containing compound can be mixed with reactants used to prepare the acidic polymer. The acidic polymer is then formed (i.e., polymerized) in the presence of the amine-containing compound. See, for example, the method described in U.S. Pat. No. 5,028,484 for further detail on blending using this sequence. The components can also be blended, by solvent blending or by using any suitable physical means, after the acidic polymer is formed.

Physical blending devices that provide dispersive mixing, distributive mixing, or a combination of dispersive and distributive mixing are useful in preparing homogenous blends. Both batch and continuous methods of physical blending can be used. Examples of batch methods include those using BRABENDER equipment (e.g., BRABENDER PREP CENTER, available from C. W. Brabender Instruments, Inc.; South Hackensack, N.J.) or BANBURY internal mixing and roll milling equipment (available from FARREL COMPANY; Ansonia, Conn.). Examples of continuous methods include single screw extruding, twin screw extruding, disk extruding, reciprocating single screw extruding, and pin barrel single screw extruding. The continuous methods can include utilizing both distributive elements, such as cavity transfer elements (e.g., CTM, available from RAPRA Technology, Ltd.; Shrewsbury, England) and pin mixing elements, static mixing elements and dispersive elements (e.g., MADDOCK mixing elements or SAXTON mixing elements as described in "Mixing in Single-Screw Extruders," *Mixing in Polymer Processing*, edited by Chris Rauwendaal (Marcel Dekker Inc.: New York (1991), pp. 129, 176–177, and 185–186).

Preferably, the thermosettable PSA is prepared by blending the components in conjunction with polymerizing the acidic polymer. In addition to solely polymerizing the acidic polymer, the method described in U.S. Pat. No. 4,181,752 (Martens et al.) can be used to compound and coat thermosettable PSAs of the invention "on-web." After prepolymerization to a coatable viscosity, the monomer mixture, along with a suitable photoinitiator, amine-containing compound, optional difunctional vinyl monomer and additives, is coated onto a flexible carrier web and polymerized in a sufficiently inert (i.e., essentially oxygen free) atmosphere (e.g., a nitrogen atmosphere). Furthermore, the method described in U.S. Pat. No. 5,741,542 (Williams et al.) may be used to polymerize the thermosettable PSA "on-web."

Advantages of using "on-web" polymerization include the ability to obtain a thermosettable PSA that is at least partially crosslinked, which adds cohesive strength to the PSA. Furthermore, thicker coatings/films are able to be easily obtained when polymerizing "on-web." These advantages can even be obtained using solvent-free processing, which is beneficial from an environmental standpoint.

Additives may also be blended into the thermosettable PSA prior to cure thereof, depending on the desired properties of the thermosettable PSA and cured adhesive therefrom. The additives are added at a suitable time during preparation of the thermosettable PSA, as recognizable to one of ordinary skill in the art.

Tackifiers are one non-limiting example of additives that can be used in compositions of the invention. It is especially preferred to use tackifiers that are compatible with the acidic polymer when preparing thermosettable PSAs for bonding to low surface tension substrates. Low surface tension substrates, which are relatively nonpolar, are generally more difficult to adhere with acidic polymers because acidic polymers typically require polar substrates for adequate bonding performance. Tackifiers were found to improve adhesion of the thermosettable PSAs to such substrates by modifying the rheology (e.g., failure mode, energy dissipation characteristics, etc.) of the thermosettable PSAs and thermoset adhesives of the invention. After addition of tackifiers to thermosettable PSA compositions used to bond to, for example, polycarbonate and polymethyl methacrylate, overlap shear strengths of at least about 1.7 MPa were obtainable in thermoset adhesives therefrom.

Preferably, when used for this purpose, the tackifier is added in amounts of up to about 50% by weight, more preferably, about 5% by weight to about 30% by weight of the thermosettable PSA composition. Particularly preferred tackifiers for this purpose include those available under the trade designations, FORAL 85 (a hydrogenated glycerine rosin ester tackifier available from Hercules Inc. of Wilmington, Del.) and ECR-180 (an aromatic hydrocarbon tackifier available from Exxon Chemical Co. of Houston, Tex.).

Plasticizers can also be added to the thermosettable PSA. Other possible additives include non-reactive colorants, fillers (e.g., carbon black, hollow glass/ceramic beads, silica, titanium dioxide, solid glass/ceramic spheres, and chalk), polymeric materials (e.g., thermoplastics and elastomers), and the like. Preferably, the thermosettable PSA contains silica, hollow glass/ceramic beads, and mixtures thereof. These additives generally improve physical properties of the thermosettable PSA. Silica tends to improve cohesive strength, while providing a good peel adhesion balance, and the hollow glass/ceramic beads tend to improve physical reinforcement of thermosettable PSAs.

The various optional additives are employed in any amount, but generally amounts that do not significantly adversely affect the desired properties of thermosettable PSAs and thermoset adhesives therefrom. Typically, the total weight of such additives is limited to about 30% by total weight of the composition or less. Generally, if used, the silica is present in amounts of about 10% by weight or less, preferably about 5% by weight or less of the total composition weight. Generally, if used, the hollow glass/ceramic beads are present in amounts of about 2% by weight or less, preferably about 1% by weight or less, and more preferably about 0.5% by weight or less of the total composition weight.

Application of the Thermosettable PSA

The thermosettable PSA and thermoset adhesive therefrom can be used to bond any suitable substrate or substrates. Thermosettable PSAs and thermoset adhesives of the invention are particularly useful for bonding substrates that soften at relatively low temperatures (e.g., low surface tension substrates). "Low surface tension substrates" are those that have a surface energy of less than 45 dyne/centimeter, more typically less than 40 dyne/centimeter or less than 35 dyne/centimeter. Included among such materials are polyethylene, polypropylene, acrylonitrile-butadiene-styrene, and polyamide. Other substrates may also have properties of low surface tension substrates due to a residue or film, such as an oil residue, on the surface of the substrate. Other polymers of somewhat higher surface energy that may be usefully bonded with the compositions of the invention include polycarbonate and polymethyl methacrylate. However, the invention is not so limited. The compositions may be used to bond any plastic, as well as wood, ceramics (e.g., glass), concrete, metals (primed and painted metals), and the like. Given their ability to bond to a wide variety of substrates, the compositions are particularly useful when bonding two dissimilar substrates (e.g., a glass substrate to a metal substrate).

The substrate is selected depending on the particular application in which it is to be used. For example, the thermosettable PSA can be applied to sheeting products (e.g., decorative, reflective, and graphical), labelstock, and tape backings. Thermosettable PSAs according to the present invention can be utilized to form tape, for example. To form a tape, the thermosettable PSA is coated onto at least a portion of a suitable backing. A release material (e.g., low adhesion backsize) can be applied to the opposite side of the backing, if desired. When double-sided tapes are formed, the thermosettable PSA is coated onto at least a portion of both sides of the backing. When forming a transfer tape, the thermosettable PSA is coated onto at least a portion of a release liner.

The substrate material is selected based on the desired application. Typically, the substrate comprises a nonwoven, paper, polypropylene (e.g., biaxially oriented polypropylene (BOPP)), polyethylene, polyester (e.g., polyethylene terephthalate), or release liner (e.g., siliconized liner).

When bonding two substrates together, the thermosettable PSA is applied to one or both surfaces to be bonded. Then, the surfaces to be bonded are mated and the thermosettable PSA can be cured to form the thermoset adhesive of the invention. The thermosettable PSA can be cured at any time up to the useful shelf life of the thermosettable PSA (i.e., the time period during which the thermosettable PSA remains an uncured PSA capable of being cured to form a thermoset adhesive). Thus, advantageously, the substrates can be mated and continuously unmated followed by mating until exact positioning of the substrates with respect to each other is obtained. Once obtained, the substrates can then be more permanently or more aggressively bonded by curing the thermosettable PSA.

Thermosettable PSAs can be applied to a substrate using methods well known to one of ordinary skill in the art. For example, the compositions can be coated using a solvent-based method. That is, the compositions can be coated by such methods as knife coating, roll coating, gravure coating, rod coating, curtain coating, and air knife coating. The coated solvent-based PSA is then dried to remove the solvent. Typically, the coated solvent-based PSA is subjected to increased temperatures, such as those supplied by an oven, to expedite drying of the adhesive. However, the temperature should not exceed the curing temperature for the amine-containing compound if it is not desired to immediately cure the PSA.

The compositions can also be coated using a solvent-free method. Solvent-free methods are preferred. For example, the compositions can be directly coated on a substrate prior to polymerization of the acidic polymer therein. See, U.S. Pat. No. 5,028,484 for a description of such a method.

When coating thermosettable PSA compositions of the invention onto a substrate, the compositions are coated to any suitable thickness. When forming a transfer tape, however, or an otherwise single-layer thermosettable PSA, it is preferred that the thermosettable PSA have a thickness of at least about 25 $\mu$m, more preferably at least about 125 $\mu$m, and most preferably at least about 0.5 mm in order to provide structural integrity to the thermosettable PSA, facilitating ease of use.

Compositions of the invention can be cured by heating using a conventional forced air heating oven, in one embodiment at a temperature of from about 80° C. to about 150° C., preferably from about 80° C. to about 110° C., and more preferably at a temperature of from about 80° C. to about 95° C. In certain embodiments, cure can be effected in less than one minute, particularly at the higher temperatures within these ranges. After cure is substantially complete, heating can optionally be continued in order to improve physical properties (e.g., overlap shear strength or tensile strength) of the cured product.

Suitable sources of heat to cure compositions of the invention include induction heating coils, ovens, hot plates, heat guns, infrared (IR) sources, lasers, and microwave sources, etc. When rapid curing is required, for example in the bonding or sealing of automobile components, induction heating may be a beneficial heating method to use.

The thermosettable PSAs, semi-structural adhesives, and structural adhesives herein are exemplified in the following examples. These examples are merely for illustrative purposes only and are not meant to be limiting on the scope of the appended claims.

EXAMPLES

The following terms are used in the examples that follow:

"AA" is acrylic acid
"AEROSIL R-972" is a trade designation for hydrophobic fumed silica particles available from Degussa Corp. of Ridgefield Park, New Jersey
"CAB-O-SIL M5" is a trade designation for submicron silica particles sold by Cabot Corp. of Tuscola, Illinois
"AMICURE CG-1200" and "AMICURE CG-1400" are trade designations for dicyandiamide (90% of particles <30 μm and <10 μm diameter, respectively) available from Air Products Co. of Allentown, Pennsylvania
"C15/250" is a trade designation for SCOTCHLITE brand glass bubbles available from Minnesota Mining and Manufacturing Company of St. Paul, Minnesota
"ECR-180" is an aromatic hydrocarbon tackifier available from Exxon Chemical Co. of Houston, Texas
"ED-5100" is a 2.5 centimeters × 7.6 centimeters × 0.9 centimeter e-coated steel coupon available from Advanced Coatings Technology of Hillside, Michigan
"FORAL 85" is a hydrogenated glycerine rosin ester tackifier available from Hercules Inc. of Wilmington, Delaware
"HDDA" is hexanediol diacrylate
"IOA" is isooctyl acrylate
"KB-1" and "IRGACURE 651" are product trade designations denoting 2,2-dimethoxy-2-phenylacetophenone photoinitiators available from Sartomer Co. of Exton, Pennsylvania and Ciba-Geigy Corp. of Ardsley, New York, respectively Unless otherwise specified, the chemicals used in the following examples were available from standard chemical vendors such as Aldrich Chemical Co. of Milwaukee, Wis.

90° Peel Adhesion Test Procedure

A 1.27 centimeter by 15.2 centimeter strip (0.5 millimeter thick) of the thermosettable PSA to be tested was laminated to a 0.13 millimeter thick strip of anodized aluminum. The aluminum strip was then laminated to a cold rolled stainless steel panel (trade designation 304-BA, available from Assurance Manufacturing; Minneapolis, Minn.), cleaned with three wipes of a 50:50 mixture, based on parts by weight, of water and isopropanol, and pressed together with two passes of a 6.8 kilogram roller. The panel was then attached to a fixture in one jaw of an INSTRON Tensile Tester (model number 4501, available from Instron Corp. of Canton, Mass.) so that the aluminum strip would be pulled from the adhesive at a 90° angle and a rate of 30.48 centimeters/minute. The peel adhesion value, thus obtained, was recorded in pounds per half inch and converted to Newtons per decimeter (N/dm).

Overlap Shear Strength Test Procedure

The overlap shear strength of the thermosettable adhesive being tested was determined by adhering a 1.27 centimeter by 2.54 centimeter strip (0.5 millimeter thick) of the adhesive between overlapping ends of ED-5100, E-coated panels (available from Advanced Coatings Technology; Hillsdale, Mich.) measuring 2.54 centimeters by 7.5 centimeters, such that the free ends of the panels extended in opposite directions. The 2.54 centimeter dimension of the adhesive was placed across the width (2.54 centimeters) of the panels. The composite was pressed together with two passes of a 6.8 kilogram roller and cured in an oven as indicated in the following examples. The sample was then cooled to room temperature and tested by extending the free ends of the panel in the jaws of an INSTRON Tensile Tester (model number 4501, available from Instron Corp., of Canton, Mass.) and separating the jaws at a rate of 5 centimeters/minute. The overlap shear strength value of the cured adhesive, thus obtained, was recorded in pounds per square inch and converted to MegaPascals (MPa).

Tensile Strength and Elongation After Final Cure Test Procedure

The thermosettable PSA was thermally cured in an oven as indicated in the following examples and cooled to room temperature. A dumbbell-shaped test sample of the cured adhesive (prepared according to ASTM D-412) was clamped into the jaws of an INSTRON Tensile Tester (model number 4501, available from Instron Corp. of Canton, Mass.) and the jaws were separated at a rate of 50.8 centimeters per minute. The tensile force required to break the test sample was recorded in MegaPascals (MPa). The elongation at break was recorded as the length of the sample at break as a percent of the original length.

Dynamic Mechanical Analysis (DMA) Test Procedure

Samples prepared from the formulations of Examples 8(A) and 8(13) were tested using DMA. Samples of PSA films, having a PSA thickness of 0.5 millimeters, were die cut into 25 millimeter-diameter disks. DMA testing was then conducted on the disks in the shear mode using a 25 millimeter parallel plate geometry on a RDA II rheometer (commercially available from Rheometrics Scientific Inc.; Piscataway, N.J.).

Measurements were conducted using a strain amplitude of 5% and a frequency of 1 rad/second while the sample temperature was increased in 2° C. increments and using a 30 second soak time. An increase in elastic modulus, G', over a small temperature range upon heating a sample is consistent with the onset of curing in the sample.

General Procedure A: Preparation of Isooctyl Acrylate/Acrylic Acid Syrups

A premix was prepared using isooctyl acrylate (IOA) and acrylic acid (AA) combined with 0.04 gram KB-1 photoinitiator per hundred weight of IOA and AA. The mixture was partially polymerized in an inert nitrogen atmosphere using a bank of 40-Watt fluorescent black lights (Sylvania Model Number F48T12/22011/40, available from Osram Sylvania of Danvers, Mass.) to provide a coatable syrup as described in U.S. Pat. No. 5,028,484. The monomer conversion in the coatable syrup was approximately 10–15%. In this manner, syrups were prepared having weight ratios of IOA:AA of 100:0, 98:2, 95:5, 90:10, and 85:15.

General Procedure B: Preparation of Bonding Tapes

Unless otherwise specified, all PSAs prepared in the examples were knife-coated onto a biaxially-oriented, 0.05-millimeter-thick, siliconized polyethylene terephthalate (PET) film and covered by a second such PET film. For knife coating, the knife was adjusted to provide a uniform coating of the PSA having a thickness of about 0.5 millimeters. The composite thus formed was exposed to a bank of SYLVANIA brand 40-Watt ultraviolet fluorescent lamps (available from Osram Sylvania of Danvers, Mass.) in an inert atmosphere, providing ultraviolet radiation at a constant (i.e., flat) light profile of 760 milliJoules per centimeter squared (total energy) and 3 milliWatts per centimeter squared (total intensity) for one surface of the composite and 750 milliJoules per centimeter squared (total energy) and 3 milliWatts per centimeter squared (total intensity) for the opposite surface of the composite to form a bonding tape according to NIST (National Institute of Standards and Technology) standards.

General Procedure C: Bonding of Tapes to Substrates

Unless otherwise specified, thermosettable PSA tapes used for bonding substrates in the following examples were laminated to a cleaned test substrate, as noted in the particular example, with two passes of a 2.2-kilogram roller and placed in a forced air oven at the specified temperature to cure the thermosettable PSA to a semi-structural or structural adhesive.

EXAMPLE 1(A)

A partially polymerized premix (having a weight ratio of 90:10 and prepared according to General Procedure A) was diluted with acrylic acid such that the final weight ratio of IOA:AA was 87.5:12.5. To 100 grams of the 87.5:12.5 syrup thus prepared was added, with mixing, 9 grams AMICURE CG-1400, 200 microliters of a 1:1 weight ratio mixture of HDDA and IOA, 4.9 grams AEROSIL R-972, 0.5 gram C15/250 glass bubbles, and 0.15 gram KB-1. The mixture was then coated and irradiated according to General Procedure B. The resulting bonding tape was applied to various substrates according to General Procedure C, with the specific substrate being noted in Table 1. Each assembly was cured at 110° C. for 25 minutes.

EXAMPLE 2(B)

The procedure of Example 1(A) was repeated except that an additional 10 grams FORAL 85 tackifier was added to the mixture prior to coating.

EXAMPLE 1(C)

The procedure of Example 1(A) was repeated except that an additional 10 grams ECR-180 tackifier was added to the mixture prior to coating.

TABLE 1

| | Overlap Shear Strength (MPa) Substrate | | |
|---|---|---|---|
| Example | White Nylon[1] | Polymethyl Methacrylate[2] | Polycarbonate[3] |
| 1(A) | 1.54 | 1.5 | 0.88 |
| 1(B) | 2.32 | 1.99 | 1.72 |
| 1(C) | 2.44 | 2.03 | 1.54 |

[1] an uncoated fabric woven of 420 denier nylon available from Milliken & Company; Spartanburg, South Carolina
[2] 2.5 centimeter × 5.1 centimeter × 1.3 centimeter MC grade clear, acrylic coupons available from Rohm & Haas Company; Philadelphia, Pennsylvania under the trade designation, PLEXIGLAS (the coupons were cleaned with 50% aqueous isopropanol prior to lamination)
[3] 2.5 centimeter × 5.1 centimeter × 1.3 centimeter clear, polycarbonate coupons (available under the trade designation, LEXAN, from General Electric of Company; Schenectady, New York; the coupons were cleaned with 50% aqueous isopropanol prior to lamination)

EXAMPLE 2(A)

A partially polymerized premix having a weight ratio of 90:10 and prepared according to General Procedure A was diluted with acrylic acid such that the final weight ratio of IOA:AA was 85:15. To 100 grams of the 85:15 syrup thus prepared was added, with mixing, 18 grams AMICURE CG-1200, 200 microliters of a 1:1 mixture by weight of HDDA and IOA, 5 grams AEROSIL R-972, 0.5 gram C15/250 glass bubbles, and 0.15 gram KB-1. The mixture was then coated and irradiated according to General Procedure B. The resulting bonding tape was applied to ED-5100 e-coated steel coupons according to General Procedure C. Each assembly was cured at 110° C. for 5 minutes.

EXAMPLE 2(B)

The procedure of Example 2(A) was repeated except that the laminate curing condition was 10 minutes at 125° C.

EXAMPLE 2(C)

The procedure of Example 2(A) was repeated except that the laminate curing condition was 20.5 minutes at 110.5° C.

EXAMPLE 2(D)

The procedure of Example 2(A) was repeated except that the laminate curing condition was 20.5 minutes at 90° C.

EXAMPLE 2(E)

The procedure of Example 2(A) was repeated except that the laminate curing condition was 10 minutes at 96° C.

EXAMPLE 2(F)

The procedure of Example 2(A) was repeated except that the laminate curing condition was 31 minutes at 96° C.

TABLE 2

| Example | Overlap Shear Strength (MPa) |
|---|---|
| 2(A) | 5.66 |
| 2(B) | 8.59 |
| 2(C) | 7.58 |
| 2(D) | 5.67 |
| 2(E) | 5.41 |
| 2(F) | 7.14 |

EXAMPLE 3(A)

A partially polymerized premix having a weight ratio of 90:10 and prepared according to General Procedure A was diluted with acrylic acid such that the final weight ratio of IOA:AA was 85:15. To 100 grams of the 85:15 syrup thus prepared was added, with mixing, 18 grams AMICURE CG-1200, 200 microliters of a 1:1 mixture by weight of HDDA and IOA, 5 grams AEROSIL R-972, 0.5 gram C15/250 glass bubbles, and 0.15 gram KB-1. The mixture was then coated and irradiated according to General Procedure B. The resulting bonding tape was applied to various substrates noted in Table 3 according to General Procedure C and cured at 110° C. for 25 minutes.

EXAMPLE 3(B)

The procedure of Example 3(A) was repeated except that the AMICURE CG-1200 was replaced with AMICURE CG-1400, an amine-containing compound having a smaller particle size.

TABLE 3

| Example | Uncured 90° Peel Adhesion (N/m) to Stainless Steel | Cured Overlap Shear Strength to ED-5100 (MPa) | Cured Tensile Strength (MPa) | Cured Elongation at Break (%) |
|---|---|---|---|---|
| 3(A) | 532.3 | 6.49 | 5.56 | 498 |
| 3(B) | 308.2 | 9.18 | 7.19 | 500 |

EXAMPLE 4(A)

A partially polymerized premix having a weight ratio of 100:0 and prepared according to General Procedure A was diluted with acrylic acid to a final weight ratio of IOA:AA of 85:15. To 100 grams of the 85:15 syrup thus prepared was added, with mixing, 18 grams AMICURE CG-1200, 200 microliters of a 1:1 mixture by weight of HDDA and IOA, 5 grams AEROSIL R-972, 0.5 gram C15/250 glass bubbles, and 0.15 gram KB-1. The mixture was then coated and irradiated according to General Procedure B. The resulting bonding tape was applied to various substrates noted in Table 4 according to General Procedure C and cured at 110° C. for 25 minutes.

EXAMPLE 4(B)

The procedure of Example 4(A) was repeated except that the partially polymerized premix used was in a weight ratio of IOA:AA of 98:2.

EXAMPLE 4(C)

The procedure of Example 4(A) was repeated except that the partially polymerized premix used was in a weight ratio of IOA:AA of 95:5.

EXAMPLE 4(D)

The procedure of Example 4(A) was repeated except that the partially polymerized premix used was in a weight ratio of IOA:AA of 90:10.

EXAMPLE 4(E)

The procedure of Example 4(A) was repeated except that the partially polymerized premix used was in a weight ratio of IOA:AA of 85:15.

TABLE 4

| Example | Uncured 90° Peel Adhesion to Stainless Steel (N/m) | Cured Overlap Shear Adhesion to ED-5100 (MPa) | Cured Tensile Strength (MPa) | Cured Elongation at Break (%) |
|---|---|---|---|---|
| 4(A) | 280.2 | 5.18 | 4.71 | 454 |
| 4(B) | 266.2 | 6.40 | 5.81 | 468 |
| 4(C) | 315.2 | 7.13 | 6.90 | 543 |
| 4(D) | 532.3 | 6.49 | 5.56 | 498 |
| 4(E) | 609.4 | 6.05 | 3.83 | 512 |

EXAMPLE 5(A)

To 100 grams of a partially polymerized premix syrup having a weight ratio of IOA:AA of 90:10 and prepared according to General Procedure A was added, with mixing, 5 grams AMICURE CG-1400, 200 microliters of a 1:1 mixture by weight of HDDA and IOA, 8.6 grams AEROSIL R-972, 0.5 gram C15/250 glass bubbles, and 0.15 gram KB-1. The mixture was then coated and irradiated according to General Procedure B. The resulting bonding tape was applied to various substrates as noted in Table 5 according to General Procedure C and cured at 110° C. for 20 minutes.

EXAMPLE 5(B)

The procedure of Example 5(A) was repeated except that 8 grams AMICURE CG-1400 was used.

TABLE 5

| Example | Uncured 90° Peel Adhesion to Stainless Steel (N/m) | Cured Overlap Shear Adhesion to ED-5100 (MPa) | Cured Tensile Strength (Mpa) | Cured Elongation at Break (%) |
|---|---|---|---|---|
| 5(A) | 781 | 6.3 | 3.98 | 397 |
| 5(B) | 820 | 6.3 | 3.93 | 415 |

EXAMPLE 6

To 100 grams of a partially polymerized premix having a weight ratio of IOA:AA of 85:15 was added, with mixing, 18 grams AMICURE CG-1200, 200 microliters of a 1:1 mixture by weight of HDDA and IOA, 5 grams CAB-O-SIL M5, 0.5 gram C15/250 glass bubbles, and 0.15 gram KB-1. The mixture was coated and irradiated according to General Procedure B. The resulting bonding tape was applied to ED-5100 coupons according to General Procedure C and cured at 110° C. for 25 minutes.

TABLE 6

| Example | Cured Overlap Shear Adhesion to ED-5100 (MPa) | Cured Tensile Strength (MPa) | Cured Elongation at Break (%) |
|---|---|---|---|
| 6(A) | 5.54 | 3.16 | 381 |

EXAMPLES 7(A)–7(F)

These examples illustrate the performance of bonding tapes of the invention compared to high quality commercial structural bonding tapes. Example 7(A) was cured at the product's recommended curing temperature of 140° C. Samples 7(B)–7(F) were cured at 110° C. Results of testing shown in Table 7 demonstrate, among other advantages, the improved low temperature cure bonding capabilities of bonding tapes of the invention.

COMPARATIVE EXAMPLE 7(A)

3M™ Automotive Structural Bonding Tape (an epoxy/acrylate tape having product number 9245) was obtained from Minnesota Mining and Manufacturing Company of St. Paul, Minn. The bonding tape was applied to ED-5100 e-coated steel coupons according to General Procedure C. Each assembly was cured at 140° C. for 25 minutes.

COMPARATIVE EXAMPLE 7(B)

The same procedure was followed as in Example 7(A) except that each assembly was cured at 110° C. for 25 minutes.

EXAMPLE 7(C)

A partially polymerized premix having a weight ratio of IOA:AA of 90:10 was prepared according to General Procedure A and diluted with acrylic acid such that the final weight ratio of IOA:AA was 85:15. To 100 grams of the 85:15 IOA:AA thus prepared was added, with mixing, 18 grams AMICURE CG1200, 10 grams AEROSIL R-972 silica, 0.75 gram C15/250 glass bubbles, and 0.15 gram KB-1. The mixture was then coated and irradiated according to General Procedure B. The resulting bonding tape was applied to ED-5100 e-coated steel coupons according to General Procedure C. Each assembly was cured at 110° C. for 25 minutes.

EXAMPLE 7(D)

The procedure of Example 7(C) was repeated except that 100 microliters of a 1:1 mixture by weight of HDDA and IOA was also added, with mixing, into the adhesive formulation prior to curing.

EXAMPLE 7(E)

The procedure of Example 7(D) was repeated except that 200 microliters of a 1:1 mixture by weight of HDDA and IOA was also added, with mixing, into the adhesive formulation prior to curing.

EXAMPLE 7(F)

The procedure of Example 7(D) was repeated except that 5 grams AEROSIL R-972 silica and 0.50 gram C15/250 glass bubbles were added instead of the prior given amounts and AMICURE CG1200 was substituted with AMICURE CG1400. Furthermore, 200 microliters of a 1:1 mixture by weight of HDDA and IOA was also added, with mixing, into the adhesive formulation prior to curing.

TABLE 7

| Example | Uncured 90° Peel Adhesion to Stainless Steel (N/m) | Cured Overlap Shear Adhesion to ED-5100 (MPa) | Cured FRP* (Joules) | ED-5100 Side Impact** (Joules) | Cured Elongation at Break (%) |
|---|---|---|---|---|---|
| 7(A) | 735.4 | 9.83 | 89 | 34 to 81 | 70 |
| 7(B) | — | 1.85 | — | — | — |
| 7(C) | 157.6 | 6.04 | 83 | DNB | — |
| 7(D) | 185.6 | 6.92 | 88 | DNB | — |
| 7(E) | 420.2 | 6.72 | 85 | DNB | 364 |
| 7(F) | — | 9.18 | — | DNB | 500 |

*FRP means floating roller peel test according to ISO 4578:1990E
**Block Impact using 2.54 centimeter × 2.54 centimeter × 2.54 centimeter 2024 t351 aluminum cubes, according to ASTM D950-82; If the sample did not break, the value is indicated as "DNB"; Multiple test values were obtained for each example formulation, with the high and low values in the range reported in the Table.

EXAMPLE 8(A)

A partially polymerized premix having a weight ratio of IOA:AA of 90:10 and prepared according to General Procedure A was diluted with acrylic acid such that the final weight ratio of IOA:AA was 85:15. To 100 grams of the 85:15 syrup thus prepared was added, with mixing, 18 grams AMICURE CG-1400, 200 microliters of a 1:1 mixture by weight of HDDA and IOA, 5 grams AEROSIL R-972, 0.5 gram C15/250 glass bubbles, and 0.15 gram KB-1. The mixture was then coated and irradiated according to General Procedure B.

Results of DMA analysis on the sample are shown in FIG. 1, as line 10. As shown in FIG. 1, a sharp increase in the elastic modulus of samples prepared according to Example 8(A) indicated crosslink formation, or cure, of the sample starting at about 90° C.

EXAMPLE 8(B)

A partially polymerized premix having a weight ratio of IOA:AA of 90:10 was prepared according to General Procedure A. To 100 grams of the 90:10 syrup thus prepared was added, with mixing, 5 grams melamine powder (a gel formed when the melamine was added, necessitating the addition of 10 milliliters glacial acetic acid in order to break the gel), 200 microliters of a 1:1 mixture by weight of HDDA and IOA, 8.6 grams AEROSIL R-972, 0.5 gram C15/250 glass bubbles, and 0.15 gram KB-1. The mixture was then coated and irradiated according to General Procedure B.

Results of DMA analysis on the sample are shown in FIG. 1, as line 12. As shown in FIG. 1, the samples prepared according to Example 8(B) did not show any increase in elastic modulus, indicating the absence of crosslinking, or cure, even when heated up to 170° C.

EXAMPLE 9

A partially polymerized premix (97.2 grams of a 90:10 weight ratio prepared according to General Procedure A) was diluted with 2.8 grams acrylic acid such that the final weight ratio of IOA:AA was 87.5:12.5. To 100 grams of the 87.5:12.5 syrup thus prepared was added, with mixing, 9 grams AMICURE CG-1400, 100 microliters HDDA, 4.9 grams AEROSIL R-972, 0.5 grams C15/250 glass bubbles, and 0.15 gram KB-1. The mixture was then coated and irradiated according to General Procedure B.

A 1.27 centimeter by 2.54 centimeter strip (0.5 millimeter thick) of the adhesive was placed between overlapping ends of stainless steel panels (commercially available from Assurance Manufacturing; Minneapolis, Minn. under the trade designation 304-BA), measuring 2.54 centimeter by 7.5 centimeter, such that the free ends of the panels extended in opposite directions. The 2.54 centimeter dimension of the adhesive was placed across the width (2.54 centimeter) of the panels. The composite was pressed together with two passes of a 6.8-kilogram roller and cured using an induction heating unit Model HS600P available from Magneforce Inc. of Warren, Ohio for the duration of time indicated below. After waiting for 30 minutes (the sample had cooled to room temperature), the sample was tested by extending the free ends of the panel in the jaws of an INSTRON Tensile Tester (model number 4501, available from Instron Corporation of Canton, Mass.) and separating the jaws at a rate of 5 centimeters/minute to obtain the overlap shear strength of the cured adhesive.

The shear strength of the cured adhesive is reported in MegaPascals (MPa). At a dial power setting of "9" (approximately 54 Watts), an overlap shear strength of 2.6 MegaPascals (cohesive failure mode) was obtained after 10 seconds of curing. An overlap shear strength of 2.8 MegaPascals (cohesive failure mode) was obtained after 12 seconds of curing at a dial power setting of "9."

Various modifications and alterations of the invention will become apparent to those skilled in the art without departing from the spirit and scope of the invention, which is defined by the accompanying claims. It should be noted that steps in methods recited in the accompanying claims need not be performed necessarily in the order presented in the claims.

What is claimed is:

1. A thermosettable PSA composition comprising:
    100 parts by weight of an adhesive component comprising at least about 50 percent by weight of the adhesive component of at least one acidic polymer and, optionally no more than about 10 percent by weight of the adhesive component of at least one epoxy-containing material, wherein the acidic polymer is derived from about 5 to 15% by weight of at least one acidic monomer; and
    about 1 to less than about 50 parts by weight of at least one amine-containing compound capable of reacting with acidic functional groups on the acidic polymer to cure the thermosettable PSA composition into a thermoset adhesive.

2. The composition of claim 1, wherein the amine-containing compound is non-aromatic.

3. The composition of claim 1, wherein the amine-containing compound comprises at least two amines selected from primary amines, secondary amines, and mixtures thereof.

4. The composition of claim 1, wherein the amine-containing compound has a molecular weight of about 500 grams/mole or less.

5. The composition of claim 1, wherein the amine-containing compound is capable of curing the thermosettable PSA composition at temperatures of less than about 150° C.

6. The composition of claim 1, wherein the amine-containing compound is capable of curing the thermosettable PSA composition at temperatures of less than about 120° C.

7. The composition of claim 1, wherein the amine-containing compound is capable of curing the thermosettable PSA composition at temperatures of less than about 100° C.

8. The composition of claim 1, wherein the amine-containing compound is a solid at both room temperature and temperature at which the amine-containing compound is capable of curing the thermosettable PSA composition.

9. The composition of claim 1, wherein the amine-containing compound is immiscible or insoluble with the acidic polymer at room temperature and temperatures up to temperatures at which the amine-containing compound is capable of curing the thermosettable PSA composition.

10. The composition of claim 1, wherein the amine-containing compound comprises dicyandiamide.

11. The composition of claim 1, wherein the acidic polymer comprises a copolymer derived from at least one carboxylic acid.

12. The composition of claim 1, wherein the acidic polymer comprises a copolymer derived from acrylic acid.

13. The composition of claim 1, wherein the acidic polymer comprises a copolymer derived from isooctyl acrylate and acrylic acid.

14. The composition of claim 1, wherein the acidic polymer comprises an acidic (meth)acrylate polymer.

15. The composition of claim 1, wherein the adhesive component comprises 0 to about 5 percent by weight of at least one epoxy-containing material.

16. The composition of claim 1, wherein the adhesive component is essentially free of epoxy-containing materials.

17. The composition of claim 1, wherein the thermoset adhesive is a semi-structural adhesive.

18. The composition of claim 1, wherein the thermoset adhesive is a structural adhesive.

19. The composition of claim 1, wherein the amine-containing compound comprises about 5 to about 20 parts by weight of the thermosettable PSA composition.

20. A thermosettable PSA composition comprising:
   100 parts by weight of an adhesive component comprising at least about 50 percent by weight of the adhesive component of at least one acidic polymer and, optionally no more than about 25 percent by weight of the adhesive component of at least one epoxy-containing material, wherein the acidic polymer is derived from about 5 to 15% by weight of at least one acidic monomer; and
   about 1 to less than about 50 parts by weight of at least one amine-containing compound capable of reacting with acidic functional groups on the acidic polymer to cure the thermosettable PSA composition into a thermoset adhesive.

21. A thermoset adhesive composition prepared by curing the thermosettable PSA composition of claim 1.

22. A thermoset adhesive composition preparable by curing the thermosettable PSA composition of claim 1.

23. A substrate at least partially coated with the thermosettable PSA composition of claim 1.

24. A substrate at least partially coated with a thermoset adhesive composition prepared by curing the thermosettable PSA composition of claim 1.

25. A composite comprising:
   a first substrate,
   a second substrate, and
   a thermosettable PSA composition of claim 1 positioned between the first and second substrates.

26. A composite comprising:
   a first substrate,
   a second substrate,
   a thermoset adhesive composition prepared by curing the thermosettable PSA composition of claim 1 positioned between the first and second substrates.

27. The composite of claim 26, wherein at least one of the first and second substrates comprises a substrate selected from polycarbonate and polymethyl methacrylate and the thermoset adhesive has an overlap shear strength with respect to the substrate of at least about 1.7 MPa.

28. A tape comprising:
   a backing, and
   a layer of the thermosettable adhesive composition of claim 1 on at least a portion of at least one side of the backing.

29. A transfer tape comprising:
   a release liner, and
   a layer of the thermosettable adhesive composition of claim 1 on at least a portion of the release liner.

30. A method for bonding a substrate comprising the steps of:
   providing the substrate to be bonded,
   adhering a layer of the thermosettable PSA of claim 1 to at least one side of the substrate,
   adhering the thermosettable PSA layer to a surface to be bonded, and
   curing the thermosettable PSA to form a thermoset adhesive between the substrate and the surface.

31. The method of claim 30, wherein the step of curing the thermosettable PSA comprises heating the thermosettable PSA at a temperature of less than about 150° C.

32. The method of claim 30, wherein the step of curing the thermosettable PSA comprises heating the thermosettable PSA at a temperature of less than about 120° C.

33. The method of claim 30, wherein the step of curing the thermosettable PSA comprises heating the thermosettable PSA at a temperature of less than about 100° C.

34. A thermoset adhesive composition comprising the reaction product of:
   100 parts by weight of an adhesive component comprising at least about 50 percent by weight of the adhesive component of at least one acidic polymer and, optionally no more than about 10 percent by weight of the adhesive component of at least one epoxy-containing material, wherein the acidic polymer is derived from about 5 to 15% by weight of at least one acidic monomer; and about 1 to less than about 50 parts by weight of at least one amine-containing compound capable of reacting with acidic functional groups on the acidic polymer to cure the thermosettable PSA composition into a thermoset adhesive.

35. A thermosettable PSA composition comprising:

100 parts by weight of an adhesive component comprising at least about 50 percent by weight of the adhesive component of at least one acidic polymer and, optionally no more than about 25 percent by weight of the adhesive component of at least one epoxy-containing material, wherein the acidic polymer is derived from about 5 to 15% by weight of at least one acidic monomer; and about 1 to less than about 50 parts by weight of at least one amine-containing compound capable of reacting with acidic functional groups on the acidic polymer to cure the thermosettable PSA composition into a thermoset adhesive.

* * * * *

UNITED STATES PATENT AND TRADEMARK OFFICE
CERTIFICATE OF CORRECTION

PATENT NO. : 6,537,659 B2
DATED : March 25, 2003
INVENTOR(S) : Karim, Naimul

It is certified that error appears in the above-identified patent and that said Letters Patent is hereby corrected as shown below:

Column 8,
Line 29, insert -- . -- following "thereof".

Column 11,
Line 48, insert -- . -- following "thereof".

Column 19,
Line 17, delete "EXAMPLE 2(B)" and insert in place thereof -- EXAMPLE 1(B) --.

Signed and Sealed this

Thirtieth Day of August, 2005

JON W. DUDAS
*Director of the United States Patent and Trademark Office*